(12) United States Patent
Wei

(10) Patent No.: US 11,665,313 B2
(45) Date of Patent: May 30, 2023

(54) ADAPTIVE METHOD AND SYSTEM FOR DATA FLOW CONTROL BASED ON VARIABLE FRAME STRUCTURE IN VIDEO IMAGE PROCESSING SYSTEM

(71) Applicant: HYC (USA), INC., San Jose, CA (US)

(72) Inventor: Wei Wei, San Jose, CA (US)

(73) Assignee: HYC (USA), INC., San Jose, CA (US)

( * ) Notice: Subject to any disclaimer, the term of this patent is extended or adjusted under 35 U.S.C. 154(b) by 313 days.

(21) Appl. No.: 17/017,628

(22) Filed: Sep. 10, 2020

(65) Prior Publication Data

US 2022/0078372 A1    Mar. 10, 2022

(51) Int. Cl.
*H04N 7/01*     (2006.01)
*G09G 5/10*     (2006.01)
*G06F 3/14*     (2006.01)
*H04L 5/22*     (2006.01)

(52) U.S. Cl.
CPC ........... *H04N 7/013* (2013.01); *G06F 3/14* (2013.01); *G09G 5/10* (2013.01); *H04L 5/22* (2013.01); *G09G 2340/06* (2013.01)

(58) Field of Classification Search
CPC ....................................................... G06F 3/14
See application file for complete search history.

(56) References Cited

U.S. PATENT DOCUMENTS

2017/0345458 A1* 11/2017 Berglund ........... G11B 27/3081

\* cited by examiner

*Primary Examiner* — Gustavo Polo
(74) *Attorney, Agent, or Firm* — Raymond Y. Chau; David and Raymond Patent Firm

(57) ABSTRACT

An adaptive system is configured for a data flow control of a video image processing system, wherein the adaptive system includes a first component, a second component, and a third component. The first component includes a variable frame structure and a new variable frame structure being activated/deactivated when new signal is added. The second component includes a bit definition of VB-ID (Vertical Blanking Identifier) that identify the new variable frame structure. The third component includes a dynamic switching of the variable frame structure configured to convert a type of the variable frame structure based on a prediction of a frame data and to set a data flow control strategy.

20 Claims, 5 Drawing Sheets

| BS (Blanking Start) | VB-ID | Mvid | Naud | Dummy Video | BE (Blanking End) | Pixel Data | FS | Fill Video | FE | BS |

FIG. 3 (PRIOR ART)

| BS | VB-ID | BE | Data Flow Control Adjustment Frame | Dummy Video 1 | New Mvid | New Naud | Dummy Video 2 | Pixel Data | FS | Fill Video | FE | BS |

FIG. 4

| VB-ID Position | VB-ID Function | Detailed Definition |
|---|---|---|
| Bit 2 | Variable Frame Structure Identification | 0-Standard Frame Structure<br>1-Variable Frame Structure |

FIG. 5

| Master/slave module definition field | Frame structure selection field | Detection parameter selection list field | Data flow adjustment strategy field | Strategy implementation delay interval field | Feedback field | Check field |

FIG. 7

ADAPTIVE METHOD AND SYSTEM FOR DATA FLOW CONTROL BASED ON VARIABLE FRAME STRUCTURE IN VIDEO IMAGE PROCESSING SYSTEM

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to Field Programmable Gate Array (FPGA) and embedded system of a video image processing system, and more particularly to a video image processing system with a Display Port (DP), Mobile Industry Processor Interface (MIPI), High Definition Multimedia Interface (HDMI) of Video Electronics Standards Association (VESA), to drive display panels and terminals, such as Liquid Crystal Display (LCD) and Organic Light-Emitting Diode (OLED).

Description of Related Arts

As the video image processes the core parameter change of Intellectual Property (IP), the bandwidth of the video stream, the display mode, and characteristic bit of control register, when the frame rate (FR) changes or is too high, the Bits Per Pixel (BBP) of the input pixel data is too high, and the actual operating frequency of the IP core exceeds the normal operating range of the video image processing system, jitter and misalignment will occur during image display. At the same time, the power consumption of the video image processing system will be too high or unstable.

SUMMARY OF THE PRESENT INVENTION

The invention is advantageous in that it provides an adaptive method and system for a data flow control based on variable frame structure in a video image processing system.

Another advantage of the invention is to an adaptive method and system, which provides different implementation strategies for data flow control based on the variable frame structure in a video image processing system.

Another advantage of the invention is to an adaptive method and system, wherein a frame brightness is determined to determine one of a plurality of strategies for data flow control.

Another advantage of the invention is to an adaptive method and system, which can ensure the display quality of the video image processing system, as much as possible without adjusting the data flow to effectively reduce the system complexity.

Another advantage of the invention is to an adaptive method and system, which can initially ensure the image display quality when the data flow adjustment of the variable frame structure is enabled, so as to ensure the normal display through the gradual adjustment.

Another advantage of the invention is to an adaptive method and system, which provides a strategy implementation delay interval in all strategies which can be selectively adjusted to achieve a better compromise between implementation complexity and implementation accuracy and can adjust the time sequence of the entire video image processing system so as to ensure the correctness and completeness of the time sequence thereof.

Another advantage of the invention is to an adaptive method and system, which can be implemented with any existing video image processing system for data flow control.

Additional advantages and features of the invention will become apparent from the description which follows, and may be realized by means of the instrumentalities and combinations particular point out in the appended claims.

According to the present invention, the foregoing and other objects and advantages are attained by an adaptive system, which is executed by a processor, for a data flow control of a video image processing system, comprising:

a first component comprising a variable frame structure being set and a new variable frame structure being activated/deactivated when new signal is added;

a second component comprising a bit definition of VB-ID (Vertical Blanking Identifier) being added to identify the new variable frame structure; and a third component comprising a dynamic switching of the variable frame structure configured to convert a type of the variable frame structure based on a prediction of a frame data and to set a data flow control strategy.

In accordance with another aspect of the invention, the present invention comprises an adaptive method for the data flow control based on variable frame structure in the video image processing system, comprising the following steps.

(1) Determine a master/slave module definition field (or related registered definition field) in response to a physical platform module of the video image processing system, wherein the master/slave module definition field is compatible with all modules and is able to be uniquely identified.

(2) Via a main module of the video image processing system, determine a frame type being used in the video image processing system and initialize a frame structure selection field.

(3) Via the main module of the video image processing system, determine all detection parameters being used in the video image processing system and initialize a detection parameter selection field.

(4) Via the main module of the video image processing system, determine one or more data flow adjustment strategies (i.e. data flow control implementation strategy) used in the video image processing system, and initialize a data flow adjustment strategy field.

(5) Via the main module of the video image processing system, determine a strategy implementation delay used in the video image processing system, and initialize the strategy implementation delay interval field.

(6) Performs detection to obtain one of more detection results according to the detection parameters determined by a list of the detection parameter selection field via the main module of the video image processing system.

(7) Via the main module of the video image processing system, select different data flow adjustment strategies according to the detection results, and determine the strategy implementation delay interval field.

(8) Via the main module of the video image processing system, implement a data flow control based on the frame structure.

(9) Via the main module of the video image processing system, confirm a signaling feedback field, and feedback a data flow control adjustment status and the strategy implementation delay interval.

(10) Via the main module of the video image processing system, receive a signaling feedback field, and adjust the data flow control adjustment status and the strategy implementation delay interval in response to the data flow control.

(11) Via the main module of the video image processing system, wait for the strategy implementation delay interval according to the strategy implementation delay interval. If its run time is out, go to step (2), otherwise go to step (12).

(12) Based on the variable frame structure, end the data flow control flow of the video image processing system.

Still further objects and advantages will become apparent from a consideration of the ensuing description and drawings.

These and other objectives, features, and advantages of the present invention will become apparent from the following detailed description, the accompanying drawings, and the appended claims.

BRIEF DESCRIPTION OF THE DRAWINGS

FIG. 3 is a table illustrating a standard frame structure.

FIG. 4 is a table illustrating the variable frame structure used in data flow control adjustment according to the preferred embodiment of the present invention.

FIG. 5 is a table illustrating an example of reusing the bit to identify the new variable frame structure according to the preferred embodiment of the present invention.

FIG. 7 is a table illustrating an embodiment of the signaling field used in the data flow control signaling interaction module according to the preferred embodiment of the present invention.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 1:
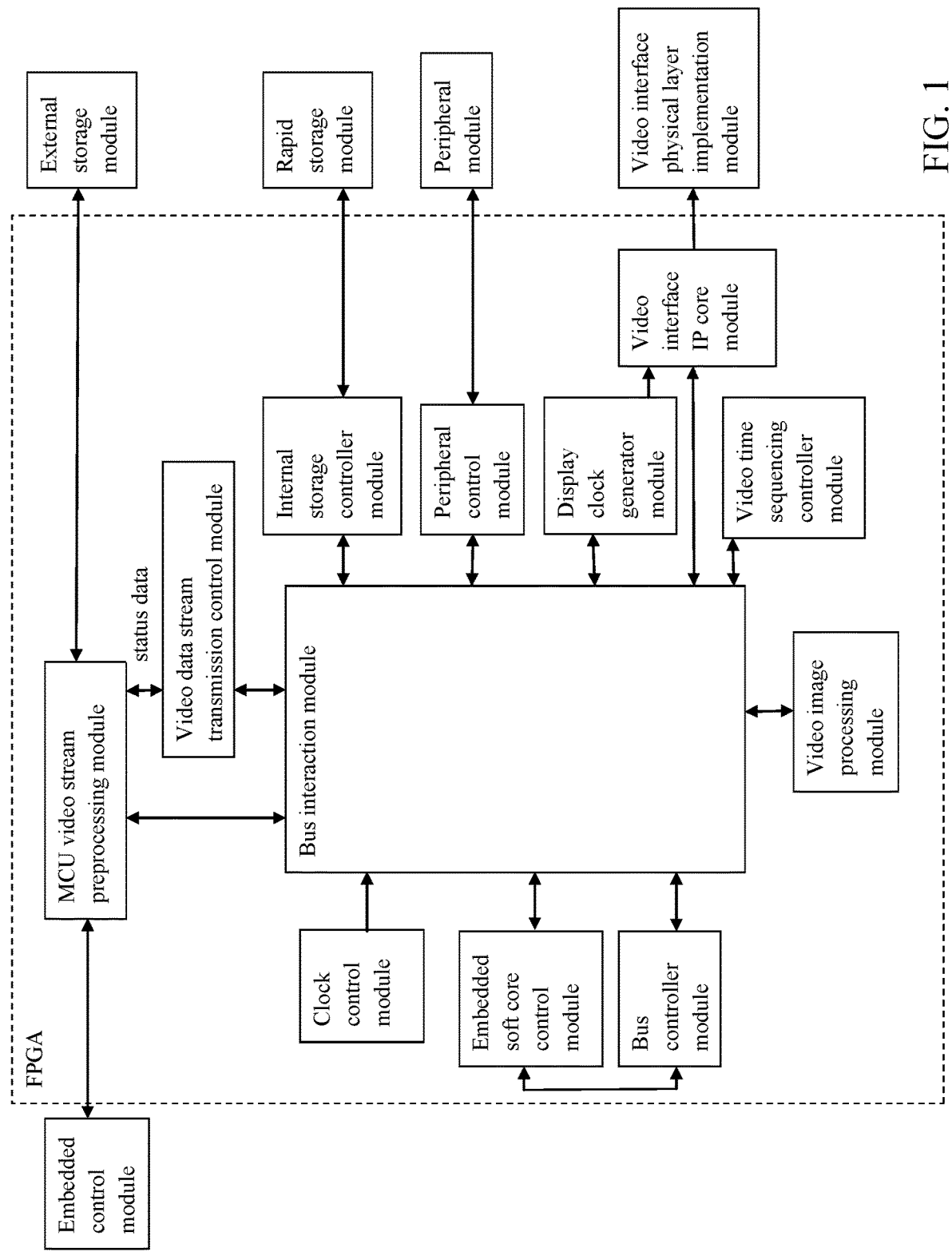
FIG. 1 is a block diagram illustrating a video image processing system according to a preferred embodiment of the present invention, illustrating the hardware system and platform of the video image processing system.
Figure 2:
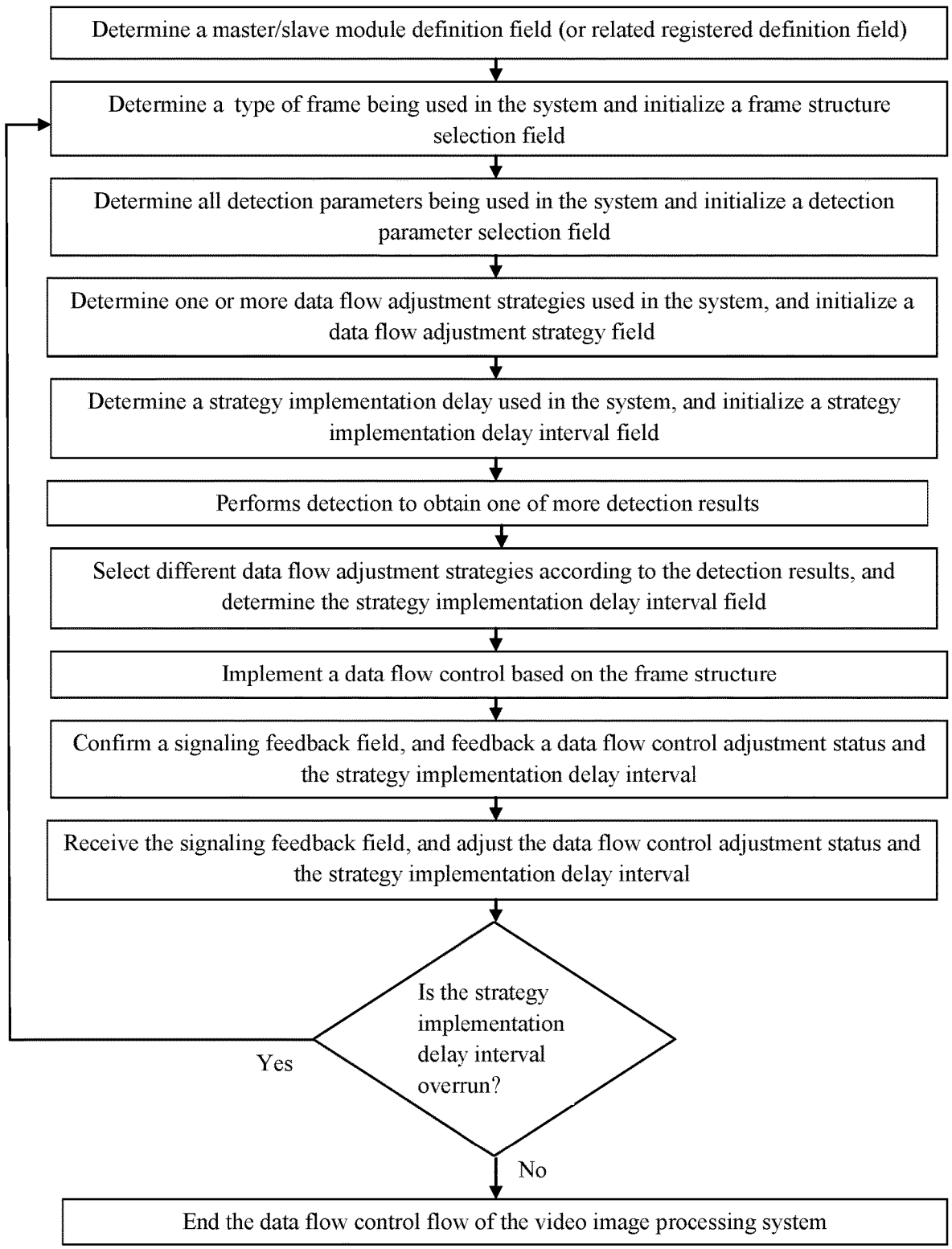
FIG. 2 is flow chart illustrating an adaptive method for the data flow control based on variable frame structure in the video image processing system according to the preferred embodiment of the present invention.

Referring to FIGS. 1 and 2 of the drawings, an adaptive method and system for a data flow control based on variable frame structure in a video image processing system is illustrated. As shown in FIG. 1, the video image processing system, which is executed by a processor, is constructed by a hardware system and a platform and comprises an embedded control module, a FPGA (Field Programmable Gate Array) module, an external storage module, a rapid storage module, a peripheral module, and a video interface physical layer implementation module.

The embedded control module, which can use any embedded chip and system, is mainly configured to initiate signaling interaction, such as reading/writing registers, enabling/disabling video display modules, peripheral control, video display module parameter settings, etc.

The FPGA module is mainly configured for storage control peripheral control, and video interface IP (Intellectual Property) core, which requires large amount of data processing and latency.

The external storage module is mainly configured for the storage of raw data stream of the video image that needs to be displayed in the video image processing system, wherein the external storage module can be, but not limited to, NandFlash, SSD and other storage media.

The rapid storage module is configured to incorporate with the FPGA module, wherein during the large amount of data processing and latency of the FPGA module, the rapid storage module uses fast and low-latency physical system to reduce the time delay for data storage of the FPGA module. The rapid storage module can be, but not limited to, DDR3.

The peripheral module can be, but not limited to, one of GPIO (General-purpose input/output), UART (Universal Asynchronous Receiver/Transmitter), USB (Universal Serial Bus), and network port.

The video interface physical layer implementation module is mainly configured for implementing the physical layer to drive the display module, wherein the video interface physical layer implementation module can be, but not limited to, TX/RX (Transmitter/Receiver)-PHY of Display Port, DPHY of MIPI, etc.

Furthermore, the FPGA module comprises a bus interaction module, a MCU (Microcontroller Unit) video stream preprocessing module (i.e. a processor), a video data stream transmission control module, a clock control module, an embedded soft core control module, a bus controller module, an internal storage controller module, a peripheral control module, a display clock generator module, a video time sequencing controller module, and a video interface IP core module. The process of the variable frame structure is executed by the MCU video stream preprocessing module.

The bus interaction module is mainly configured for providing selection and decision-making functions of all other modules connected to bus interaction module.

The MCU video stream preprocessing module is mainly configured for pre-processing and converting the video data stream input from the external storage module in response to the formats and parameters set by the system so as to facilitate subsequent processing of the video data steam.

The video data stream transmission control module is mainly configured for a control of the time sequence and parameters of the video data stream after the video data stream is pre-processed and converted.

The clock control module is mainly configured for the generation and control of the global clock in the video image processing system.

The embedded soft core control module, which is the control core of the FPGA module, is mainly configured for the timing control, parameter configuration, physical process implement and other core functions of all modules inside the FPGA module. The embedded soft core control module can be, but limited to, the Xilinx MicroBlaze, as an example.

The bus controller module is mainly configured for, but not limited to, the control of all modules connected to the bus interaction module.

The video image processing module is mainly configured for, but not limited to, adjusting a mode conversion and timing control of the video image data stream corresponding to the video interface IP core module.

The internal storage controller module is mainly configured for, but not limited to, the control of the rapid storage module, including data stream writing/reading, frame control, etc.

The peripheral control module is mainly configured for, but not limited to, controlling all peripheral modules, including peripheral enable/disable control, working mode control, etc.

The display clock generator module is mainly configured for, but not limited to, time controlling of all video interface IP core modules and video interface physical layer implementation modules.

The video time sequencing controller module, is mainly configured for, but not limited to, processing the data conversion and time controlling when the data input from the video image processing module is transmitted to the video interface IP core module.

FIG. 2 illustrates the adaptive method for the data flow control based on variable frame structure in the video image processing system. Accordingly, the method comprises the following steps.

(1) Determine a master/slave module definition field (or related registered definition field) in response to a physical platform module of the video image processing system, wherein the master/slave module definition field is compatible with all modules and is able to be uniquely identified.

(2) Via a main module of the video image processing system, determine a frame type being used in the video image processing system and initialize a frame structure selection field.

(3) Via the main module of the video image processing system, determine all detection parameters being used in the video image processing system and initialize a detection parameter selection field.

(4) Via the main module of the video image processing system, determine one or more data flow adjustment strategies (i.e. data flow control implementation strategy) used in the video image processing system, and initialize a data flow adjustment strategy field.

(5) Via the main module of the video image processing system, determine a strategy implementation delay used in the video image processing system, and initialize the strategy implementation delay interval field.

(6) Performs detection to obtain one of more detection results according to the detection parameters determined by a list of the detection parameter selection field via the main module of the video image processing system.

(7) Via the main module of the video image processing system, select different data flow adjustment strategies according to the detection results, and determine the strategy implementation delay interval field.

(8) Via the main module of the video image processing system, implement a data flow control based on the frame structure.

(9) Via the main module of the video image processing system, confirm a signaling feedback field, and feedback a data flow control adjustment status and the strategy implementation delay interval.

(10) Via the main module of the video image processing system, receive a signaling feedback field, and adjust the data flow control adjustment status and the strategy implementation delay interval in response to the data flow control.

(11) Via the main module of the video image processing system, wait for the strategy implementation delay interval according to the strategy implementation delay interval. If its run time is out, go to step (2), otherwise go to step (12).

(12) Based on the variable frame structure, end the data flow control flow of the video image processing system.

According to the present invention, the adaptive system for a data flow control based on variable frame structure in a video image processing system is constructed to have three components. The first component is to set a variable frame structure and add new signal to activate/deactivate a new variable frame structure. The second component is to add a bit definition of VB-ID (Vertical Blanking Identifier) to identify the new variable frame structure. The third component is a dynamic switching of the variable frame structure. The type of the variable frame structure is converted based on a prediction of the frame data to effectively reduce the complexity of data control. At the same time, a data flow control strategy is selected and set for the dynamic switching of the variable frame structure to ensure an actual operating frequency of a IP core within a normal operating range. At the same time, under a reasonable compromise between BPP (Bits Per Pixel) and FR (Frame Rate), a more reasonable balance is achieved between an assurance of the basic display effect and an improvement of the display quality.

The standard frame structure is shown in FIG. 3, wherein BS (Blanking Start), VB-ID, Mvid (M value for video), Naud (N value for audio), Dummy video, BE (Blanking End), Pixel Data, FS, Fill Video, FE, and BS are positioned in order.

Accordingly, the variable frame structure is constructed to have three portions. The first portion is prepared for adding a variable frame adjustment mechanism in the BE process when adjusting a position of BE right after a position of VB-ID. The second portion is to adjust a Dummy Video and partition the Dummy Video into two video sections, i.e. Dummy Video 1 and Dummy Video 2. The Dummy Video 1 is placed after the position of VB-ID, and is configured for data detection and related processing before the data flow control. The Dummy Video 2 is placed after the position of BE, and is configured for signaling interaction after the data flow control is started, including pixel data being prepared and sent according to new Mvid (M value for video) and Naud (N value for audio). The sum of Dummy Video 1 and Dummy Video 2 remains the same as the original Dummy Video. The third portion is to (i) add a data flow control adjustment frame at a position between the position of BE and the position of Dummy Video 1 to activate the data flow control, and (ii) re-determine information, such as information of Mvid and Naud, time sequence, etc., according to a data detection and related processing results, to form a new Mvid and a new Naud from the original Mvid and Naud in the frame structure to generate interactive signaling for data flow control and send it to the video image processing system. The new Mvid and new Naud are positioned between the position of Dummy Video 1 and the position of Dummy Video 2.

Comparing to the standard frame structure in FIG. 3, the variable frame structure used in data flow control adjustment is shown in FIG. 3, wherein BS, VB-ID, BE, Data flow adjustment frame, Dummy Video 1, New Mvid, New Naud, Dummy Video 2, Pixel Data, FS, Fill Video, FE, BS are position in order.

Accordingly, the bit definition of VB-ID (Vertical Blanking Identifier) is added to identify the new variable frame structure by using unused bits in the standard VB-ID, such as Bit[7:6] or by reusing bits that are not used in video image system, such as Bit[2]-Interlace_Flag, Bit[4]-AudioMute_Flag, Bit[6]-CompressedStream_Flag, etc. Therefore, it can be flexibly set according to, but not limited to, the actual environment in the video image system. FIG. 5 is an example of reusing the bit to identify the new variable frame structure when Interlace_Flag is assumed to be absent in the video image processing system.

According to the dynamic switching of the variable frame structure, the variable frame structure type is converted based on the prediction of the frame data to effectively reduce the complexity of data control. At the same time, a data flow control strategy is set for the dynamic switching of the variable frame structure to ensure an actual operating frequency of a IP core within a normal operating range. At the same time, under a reasonable compromise between BPP (Bits Per Pixel) and FR (Frame Rate), a more reasonable balance is achieved between an assurance of the basic display effect and an improvement of the display quality. Accordingly, the present invention is arranged to establish a frame video data automatic detection module to detect the total data volume of all lanes in the IP core and the data volume of different lanes. The detection indicators include BPP, actual operating frequency of IP core, color space, display data of the previous frame, the completed frame data of the previous multiple frame data, or the preset average and weighted average of the data after the complete frame is partitioned, to count and predict the distribution of subsequent frame data. According to the preset strategy and strategy threshold, the variable frame structure is enabled to control the data flow.

According to the dynamic switching of the variable frame structure, three modules are set in order to effectively reduce the complexity of the data flow control method based on the variable frame structure. The three modules are a data flow control adjustment frame preparation module, a data flow detection implementation module, and a data flow control signaling interaction module.

Accordingly, the data flow control adjustment frame preparation module is configured to determine the implementation parameters of the data flow control based on the variable frame structure, wherein the data flow control adjustment frame preparation module comprises an implementation of frame structure, data flow control detection parameter, BPP, frame rate (FR), and color space conversion.

The implementation of frame structure type generally comprises different types of standard frame structure and variable frame structure. When the data flow control is needed to be implemented through the detection, the variable frame structure is enabled. Otherwise, the standard frame structure is enabled to effectively reduce the complexity of the system implementation.

Data flow control detection parameter generally comprises frame pixel data, brightness detection and its algorithmic method, such as single frame detection or continuous frame detection. The frame detection method can be embodied as whole frame detection or the average or weighted average of the frame data after the complete frame is partitioned. The weighted average refers to increase the weight of the visual sensitivity at low-grayscale areas, and to reduce the weight of the visual sensitivity at high-grayscale areas, so as to ensure the best display effect during display. The frame data can be partitioned by uniform partition and non-uniform partition. Uniform partition refers to the frame data being partitioned within the effective display interval, wherein the size of each partition remains the same, so as to simplify the algorithm. Non-uniform partition refers to the use of edge detection and other algorithms to detect the pixel data in the effective display interval for effectively partitioning different areas such as low grayscale areas and high grayscale areas, and for performing different grayscale image processing methods for different areas to effectively improve the display effect. At this time, the size of the partition will correspondingly change with the use of the detection algorithm and the detection result. The non-uniform partition will improve the display effect but increase the complexity of processing and calculation.

Data flow control implementation strategy is based on variable frame structure, that is, whether to implement data flow control based on variable frame structure or not, and the specific adjustment method when implementing data flow control based on variable frame structure. There are different implementation strategies of data flow control based on a variable frame structure.

Strategy 1: Enable standard frame structure, no data flow adjustment.

Strategy 2: Enable variable frame structure, reduce brightness, and ensure display quality.

Strategy 3: Enable variable frame structure, reduce frame rate (FR), and ensure color reproduction.

Strategy 4: Enable variable frame structure, perform color space conversion, do not reduce BPP, and ensure display quality.

Strategy 5: Enable variable frame structure, adjust BPP, and ensure normal display level.

The principles of strategy implementation is that: (i) to ensure the display quality of the video image processing system, as much as possible without adjusting the data flow to effectively reduce the system complexity, and (ii) to initially ensure the image display quality when the data flow adjustment of the variable frame structure is enabled, so as to ensure the normal display through the gradual adjustment.

Figure 6:
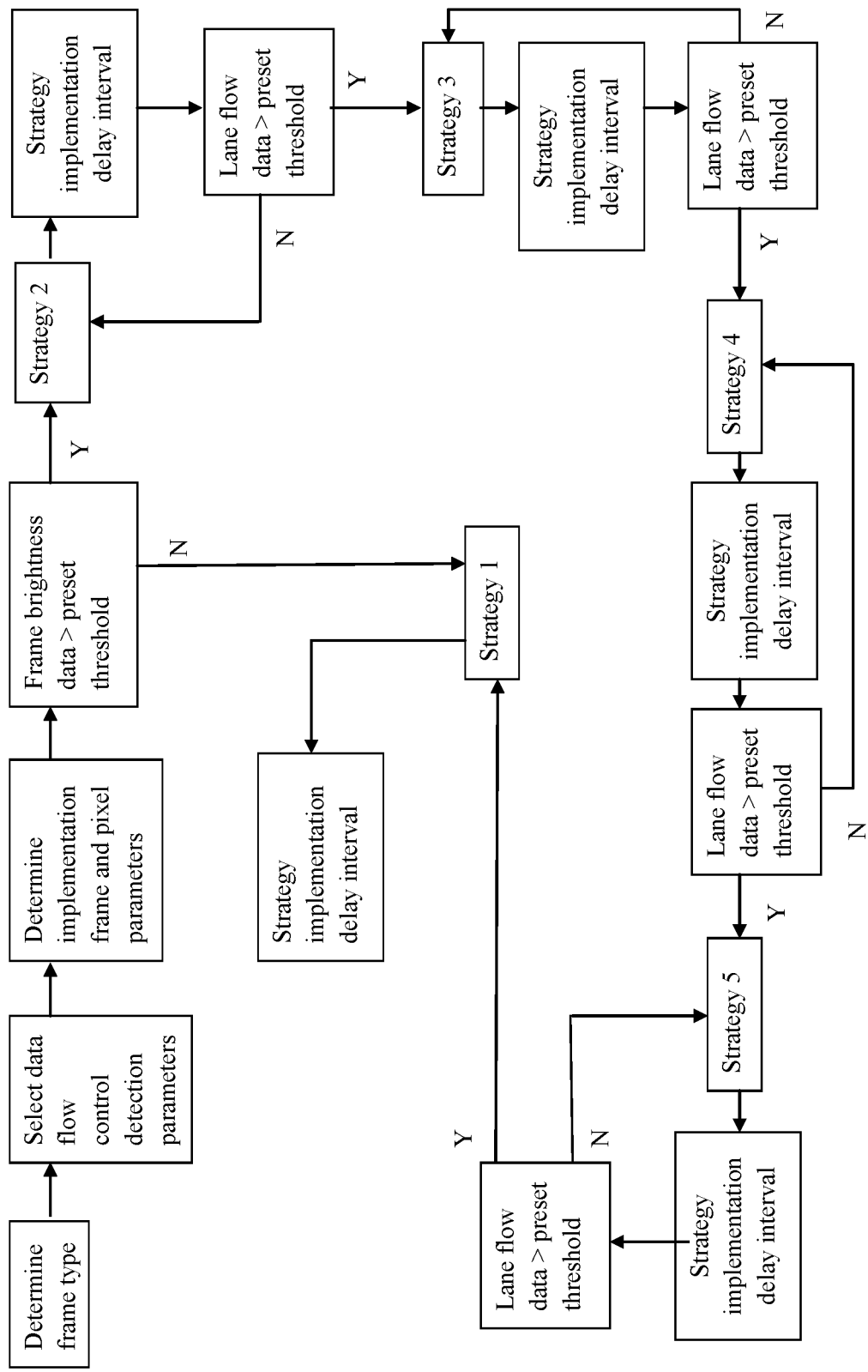
FIG. 6 is a flow diagram illustrating an example of the data flow detection implementation module according to the preferred embodiment of the present invention.

The data flow detection implementation module is configured to determine whether to enable data flow control based on the variable frame structure, and the strategy selection and delay adjustment after activation to ensure the time integrity of the entire video image processing system. This module is located in Dummy Video 1. FIG. 6 shows an example of the data flow detection implementation module.

The data flow detection implementation comprises the following steps.

(A) Determine the frame type used in data flow control based on the variable frame structure.

(B) Select data flow control detection parameters for pixel data processing in subsequent processing.

(C) Determine an implementation frame and pixel parameters, which are currently actual used parameters.

(D) Determine frame brightness data, wherein if the frame brightness data does not exceed a preset threshold, go to step (E), otherwise, go to (F).

(E) Implement strategy 1, and go to step (C) and then preset strategy implementation delay interval.

(F) Implement strategy 2, and go to step (G) and then the preset strategy implementation delay interval.

(G) Determine and detect lane flow data, if the lane flow data does not exceed a preset threshold, go to step (F), otherwise go to step (H).

(H) Implement strategy 3, and go to step (I) and then the preset strategy implementation delay interval.

(I) Determine and detect lane flow data, if the lane flow data does not exceed a preset threshold, go to step (H), otherwise go to step (J).

(J) Implement strategy 4, and go to step (K) and then the preset strategy implementation delay interval.

(K) Determine and detect lane flow data, if the lane flow data does not exceed a preset threshold, go to step (J), otherwise go to step (E).

In the step (A), the determination of the frame type is configured to determine all frame types being used in the process of the data flow control based on the variable frame structure. In this example, but are not limited to, two frame types are used.

In the step (B), the selection of the data flow control detection parameter is configured to determine all the pixel data detection parameters being used in the data flow control based on the variable frame structure.

In the step (C), the determination of the implementation frame and pixel parameters is configured to determine the actual frame implementation and pixel parameters after adjustment, i.e., the parameters actually used in the video image processing system.

In the step (D), the preset threshold of the frame brightness is selectively adjusted according to the actual need of the video image processing system.

In the step (G), the preset threshold of the lane flow data is selectively adjusted according to the actual need of the video image processing system. The preset threshold can match with single frame detection or multi-frame detection in the frame detection type. Alternatively, the preset threshold can match whole frame detection or frame partition detection.

In step (K), when all the established strategies are unable to adjust the data flow control to meet the system requirements, the present invention further comprises a restoring step via a restoring mechanism to restore the system back to its original condition where the data flow control based on variable frame structure is not used. That is, the standard framing structure is used. This will keep the video image processing system in a very good looping condition and make the system run more stable.

In one embodiment, the strategy implementation delay interval in all strategies has two functions. The first function is that the cycle of data flow control based on the variable frame structure can be selectively adjusted to achieve a better compromise between implementation complexity and implementation accuracy. The second function is to adjust the time sequence of the entire video image processing system so as to ensure the correctness and completeness of the time sequence thereof.

The data flow control signaling interaction module, which is located in Dummy Video 2, is configured for signaling interaction after the data flow control is started. The signaling interaction comprises finally determined pixels actually used in the video image processing system, and panel parameters and pixel data prepared and sent according to new Mvid and Naud. FIG. 7 illustrates one embodiment of the signaling field used in the data flow control signaling interaction module.

The data flow control signaling interaction module comprises a plurality of fields, which are:

a master/slave module definition field (or a related registered definition field), an input data control field, a parallel data control field, a data conversion field, a memory state control field, and a feedback field, wherein the master/slave module definition field (or related registered definition field) is configured to define a master module and a slave module during signaling interaction;

a frame structure selection field configured to select the frame structure type that can be used in the video image system;

a list of detection parameter selection field configured to a list of all detection parameters being used in the system and a list of detection parameters being used in the current detection condition, such that through one field, a detection parameter list used in different steps in the data flow detection implementation module can be distinguished, so as to effectively reduce the complexity of system configuration;

a data flow adjustment strategy field configured to indicate the type of strategy being used in the current data flow detection implementation module step; and a strategy implementation delay interval field configured to indicate a strategy implementation delay interval specified in different steps in the data flow detection implementation module, wherein the strategy implementation delay interval field can enhance a flexibility of the data flow control based on the variable frame structure.

Accordingly, the feedback field is configured to define the status of each module after the signaling interaction, wherein the confirmation operation of the signaling interaction is completed by ACK (Acknowledgement, confirmation)/NACK (Negative Acknowledgement, non-confirmation) or other system-defined methods.

Accordingly, the data flow control signaling interaction module further comprises a check field (if necessary) configured to guarantee the quality of the transmitted signaling and the message structure itself when the quality of the signal transmission channel cannot be guaranteed.

Figure 8:
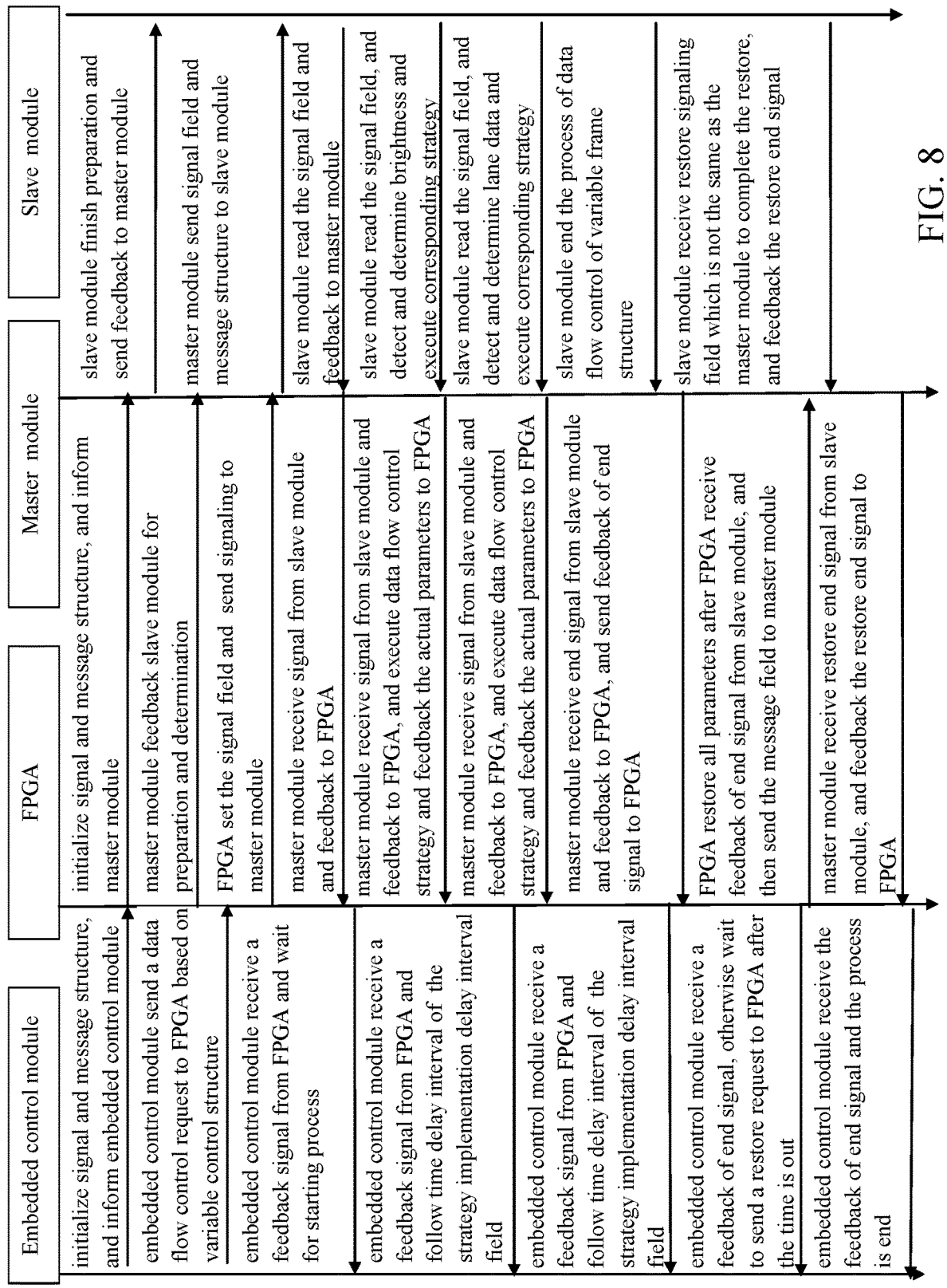
FIG. 8 illustrates an embodiment of signaling interaction used in the data flow control signaling interaction module according to the preferred embodiment of the present invention.

FIG. 8 illustrates an embodiment of signaling interaction used in the data flow control signaling interaction module. As shown in FIG. 8, the video image processing system further comprises a master/slave module configured to select data control detection parameters for determine a frame brightness in order to determine one of a plurality of strategies for data flow control. Accordingly, the embedded control module is configured to send a data flow control request to the FPGA module based on a variable control structure. After the master/salve module sends a feedback to the FPGA module, the FPGA module executes the strategy with a strategy implementation delay interval for completing the data flow control of the video image processing system. The master/slave module is further configured to determine a lane flow data in order to determine one of the strategies for the data flow control and is configured to send a restore end signal to the FPGA module, such that the FPGA module sends a feedback signal of the restore end signal to the embedded control module to end the data flow control. In one embodiment, as shown in FIG. 8, the master/slave module comprises a master module communicatively connected to the FPGA module, and a slave module communicatively connected to the master module, wherein after the slave module determines the frame brightness and the strategy, the master module is configured to send the feedback to the FPGA module.

The signaling interaction used in the data flow control signaling interaction module of the present invention comprises two effective mechanisms for preventing the effective operation of data flow control based on the variable frame structure. The first mechanism is a reverse feedback mechanism. When the video image processing system starts to implement variable frame structure for the data flow control, each module, especially the master/slave module of the implementation subject, will feedback the implementation of each step to the FPGA module and the embedded module, and will effective wait according to delay interval waiting field instructions, so as to prevent any channel congestion when the signaling channel is occupied. The second mechanism is a forward activation mechanism. After reaching the effective time indicated by time delay interval waiting field, the embedded module will actively initiate a reset request to prevent the video image processing system from being unable to properly adjust the data flow control which may cause the system being locked up.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An adaptive system, which is executed by a processor, for a data flow control of a video image processing system, comprising:
  a first component comprising a variable frame structure being set and a new variable frame structure being activated/deactivated when new signal is added;
  a second component comprising a bit definition of VB-ID (Vertical Blanking Identifier) being added to identify the new variable frame structure; and
  a third component comprising a dynamic switching of the variable frame structure configured to convert a type of the variable frame structure based on a prediction of a frame data and to set a data flow control strategy,
  wherein the variable frame structure, which is executed by the processor, is configured to:
  adjust a position of BE right after a position of VB-ID (Vertical Blanking Identifier);
  partition a Dummy Video into a Dummy Video 1 and a Dummy Video 2, wherein the Dummy Video 1 is placed after the position of VB-ID and is configured for data detection and related processing before the data flow control, wherein the Dummy Video 2 is placed after the position of BE and is configured for signaling interaction after the data flow control is started; and
  add a data flow control adjustment frame to activate the data flow control, and form a new Mvid and a new Naud from an original Mvid and an original Naud respectively.

2. The adaptive system, as recited in claim 1, wherein a sum of Dummy Video 1 and Dummy Video 2 remains the same as the Dummy Video.

3. The adaptive system, as recited in claim 1, wherein the data flow control adjustment frame at a position between the position of BE and the position of Dummy Video 1.

4. The adaptive system, as recited in claim 2, wherein the data flow control adjustment frame at a position between the position of BE and the position of Dummy Video 1.

5. The adaptive system, as recited in claim 1, wherein the new Mvid and new Naud are positioned between the position of Dummy Video 1 and the position of Dummy Video 2.

6. The adaptive system, as recited in claim 4, wherein the new Mvid and new Naud are positioned between the position of Dummy Video 1 and the position of Dummy Video 2.

7. The adaptive system, as recited in claim 1, wherein the dynamic switching of the variable frame structure comprises:
  a data flow control adjustment frame preparation module determining implementation parameters of the data flow control based on the variable frame structure;
  a data flow detection implementation module determining whether to enable the data flow control based on the variable frame structure; and
  a data flow control signaling interaction module, which is located in Dummy Video 2, configured for signaling interaction after the data flow control is started.

8. The adaptive system, as recited in claim 7, wherein the data flow control adjustment frame preparation module comprises:
  an implementation of frame structure comprises different types of standard frame structure and the variable frame structure, wherein the variable frame structure is enabled when the data flow control is needed, otherwise the standard frame structure is enabled;
  a data flow control detection parameter comprising frame pixel data and brightness detection with its algorithmic method; and
  a data flow control implementation strategy for implementing the data flow control, wherein the data flow control implementation strategy comprises:
  Strategy 1 implemented to enable the standard frame structure with no data flow adjustment;
  Strategy 2 implemented to enable the variable frame structure, reduce brightness, and ensure display quality;
  Strategy 3 implemented to enable the variable frame structure, reduce frame rate (FR), and ensure color reproduction;
  Strategy 4 implemented to enable the variable frame structure, perform color space conversion, not reduce BPP, and ensure display quality; and
  Strategy 5 implemented to enable the variable frame structure, adjust BPP, and ensure normal display level.

9. The adaptive system, as recited in claim 8, wherein the data flow detection implementation is configured to:
  (a) determine the frame type used in the data flow control based on the variable frame structure;
  (b) select the data flow control detection parameters for pixel data processing in subsequent processing;
  (c) determine an implementation frame and pixel parameters, which are currently actual used parameters;
  (d) determine frame brightness data, wherein if the frame brightness data does not exceed a preset threshold, go to step (e), otherwise, go to (f);
  (e) implement the strategy 1, and go to step (c) and then the preset strategy implementation delay interval;
  (f) implement the strategy 2, and go to step (g) and then the preset strategy implementation delay interval;
  (g) determine and detect lane flow data, if the lane flow data does not exceed a preset threshold, go to step (f), otherwise go to step (h);
  (h) implement the strategy 3, and go to step (i) and then the preset strategy implementation delay interval;

(i) determine and detect the lane flow data, if the lane flow data does not exceed the preset threshold, go to step (h), otherwise go to step (j);

(j) implement the strategy 4, and go to step (k) and then the preset strategy implementation delay interval; and (k) determine and detect the lane flow data, if the lane flow data does not exceed the preset threshold, go to step (j), otherwise go to step (e).

10. The adaptive system, as recited in claim 9, wherein the data flow detection implementation is further configured to: restore the system back to its original condition where the data flow control based on variable frame structure is not used.

11. The adaptive system, as recited in claim 9, wherein the data flow control signaling interaction module comprises:
   a master/slave module definition field configured to define a master module and a slave module during the signaling interaction;
   a list of detection parameter selection field configured to a list of all detection parameters being used in the system and a list of detection parameters being used in the current detection condition;
   a data flow adjustment strategy field configured to indicate a type of strategy being used in the current data flow detection implementation module; and
   a strategy implementation delay interval field configured to indicate a strategy implementation delay interval specified in different steps in the data flow detection implementation module.

12. The adaptive system, as recited in claim 11, wherein the data flow control signaling interaction module further comprises a feedback field configured to define a status of each module after the signaling interaction.

13. The adaptive system, as recited in claim 12, wherein the data flow control signaling interaction module further comprises a check field configured to guarantee a quality of a transmitted signaling.

14. An adaptive method for a data flow control based on a variable frame structure, comprising the steps of:
   (a) determining a master/slave module definition field (or related registered definition field) in response to a physical platform module of a video image processing system, wherein the master/slave module definition field is compatible with all modules and is able to be uniquely identified;
   (b) via a main module of the video image processing system, determining a frame type being used in the video image processing system and initializing a frame structure selection field;
   (c) via the main module of the video image processing system, determining all detection parameters being used in the video image processing system and initializing a detection parameter selection field;
   (d) via the main module of the video image processing system, determining one or more data flow adjustment strategies used in the video image processing system, and initializing a data flow adjustment strategy field;
   (e) via the main module of the video image processing system, determining a strategy implementation delay used in the video image processing system, and initializing the strategy implementation delay interval field;
   (f) performing detection to obtain one of more detection results according to the detection parameters determined by a list of the detection parameter selection field via the main module of the video image processing system;
   (g) via the main module of the video image processing system, selecting different data flow adjustment strategies according to the detection results, and determining the strategy implementation delay interval field;
   (h) via the main module of the video image processing system, implementing the data flow control based on the frame structure;
   (i) via the main module of the video image processing system, confirming a signaling feedback field, and feedback a data flow control adjustment status and the strategy implementation delay interval;
   (j) via the main module of the video image processing system, receiving a signaling feedback field, and adjusting the data flow control adjustment status and the strategy implementation delay interval in response to the data flow control;
   (k) Via the main module of the video image processing system, waiting for the strategy implementation delay interval according to the strategy implementation delay interval, wherein if its run time is out, go to step (b), otherwise go to step (I); and
   (l) based on the variable frame structure, ending the data flow control flow of the video image processing system.

15. The adaptive method, as recited in claim 14, wherein the data flow adjustment strategies are:
   Strategy 1 implemented to enable a standard frame structure with no data flow adjustment;
   Strategy 2 implemented to enable the variable frame structure, reduce brightness, and ensure display quality;
   Strategy 3 implemented to enable the variable frame structure, reduce frame rate (FR), and ensure color reproduction;
   Strategy 4 implemented to enable the variable frame structure, perform color space conversion, not reduce BPP, and ensure display quality; and
   Strategy 5 implemented to enable the variable frame structure, adjust BPP, and ensure normal display level.

16. The adaptive method, as recited in claim 15, wherein the step (c) further comprises the steps of:
   (c.1) determining the frame type used in the data flow control based on the variable frame structure;
   (c.2) selecting the data flow control detection parameters for pixel data processing in subsequent processing;
   (c.3) determining an implementation frame and pixel parameters, which are currently actual used parameters;
   (c.4) determining frame brightness data, wherein if the frame brightness data does not exceed a preset threshold, go to step (c.5), otherwise, go to (c.6);
   (c.5) implementing the strategy 1, and go to step (c.3) and then the preset strategy implementation delay interval;
   (c.6) implementing the strategy 2, and go to step (c.7) and then the preset strategy implementation delay interval;
   (c.7) determining and detecting lane flow data, if the lane flow data does not exceed a preset threshold, go to step (c.6), otherwise go to step (c.8);
   (c.8) implement the strategy 3, and go to step (c.9) and then the preset strategy implementation delay interval;
   (c.9) determining and detecting the lane flow data, if the lane flow data does not exceed the preset threshold, go to step (c.8), otherwise go to step (c.10);
   (c.10) implementing the strategy 4, and go to step (c.11) and then the preset strategy implementation delay interval; and
   (c.11) determining and detecting the lane flow data, if the lane flow data does not exceed the preset threshold, go to step (c.10), otherwise go to step (c.5).

17. A video image processing system, which is executed by a processor, comprising:
- an embedded control module for initiate signaling interaction;
- a FPGA (Field Programmable Gate Array) module, wherein the embedded control module sends a data flow control request to the FPGA module based on a variable control structure; and
- a master/slave module configured to select data control detection parameters for determining a frame brightness in order to determine one of a plurality of strategies for data flow control, wherein after the master/salve module sends a feedback to the FPGA module, the FPGA module executes the strategy with a strategy implementation delay interval for completing the data flow control of the video image processing system.

18. The video image processing system, as recited in claim 17, wherein the master/slave module is further configured to determine a lane flow data in order to determine one of the strategies for the data flow control.

19. The video image processing system, as recited in claim 18, wherein the master/slave module is configured to send a restore end signal to the FPGA module, such that the FPGA module sends a feedback signal of the restore end signal to the embedded control module to end the data flow control.

20. The video image processing system, as recited in claim 17, wherein the master/slave module comprises a master module communicatively connected to the FPGA module, and a slave module communicatively connected to the master module, wherein after the slave module determines the frame brightness and the strategy, the master module is configured to send the feedback to the FPGA module.

* * * * *